United States Patent [19]
Bauer et al.

[11] Patent Number: 5,653,335
[45] Date of Patent: Aug. 5, 1997

[54] MULTI-USE PACKAGE FOR COMPACT DISKS AND/OR DISKETTES

[75] Inventors: Chris Bauer, Nashville; Nelson Remus, Mt. Juliet, both of Tenn.

[73] Assignee: Rand McNally Media Services, Inc., Nashville, Tenn.

[21] Appl. No.: 373,012

[22] Filed: Jan. 17, 1995

[51] Int. Cl.⁶ .................................................. B65D 85/57
[52] U.S. Cl. .................................. 206/307.1; 206/308.1; 206/312; 206/309
[58] Field of Search .......................... 206/307.1, 308.1, 206/309, 310, 312

[56] References Cited

U.S. PATENT DOCUMENTS

| | | | |
|---|---|---|---|
| 4,327,831 | 5/1982 | Inaba et al. | 206/310 |
| 4,519,500 | 5/1985 | Perchak | 206/309 |
| 4,895,252 | 1/1990 | Nomula et al. | 206/308.1 |
| 5,238,107 | 8/1993 | Kownacki | 206/312 |
| 5,290,118 | 3/1994 | Ozeki | 206/308.1 |

FOREIGN PATENT DOCUMENTS 8702124  4/1989  Netherlands ........................ 206/309

*Primary Examiner*—David T. Fidei
*Attorney, Agent, or Firm*—Lee, Mann, Smith, McWilliams, Sweeney & Ohlson

[57] ABSTRACT

A two part thermo-formed package having a doughnut shaped well at one half for receiving and holding a compact disk and being formed with diskette-retaining notches for also holding a diskette. The second half of the package including raised embossments for retaining a diskette therebetween or for utilization in combination with the other half for holding a compact disk and/or diskette. The package cavity structure permits the packaging of a compact disk and/or a diskette, with the option of also holding printed inserts within the package without impeding the holding capability of the product-retaining structures within the package cavity. The package is useful for retail, direct mail and OEM applications.

13 Claims, 8 Drawing Sheets

FIG.3

DIMENSIONAL CHART

| | +/-X | +/-Y | RADIUS | ELV. MIN. | ELV. MAX. |
|---|---|---|---|---|---|
| | COLUMN TITLE | | | | |
| | +/-X | +/-Y | RADIUS | ELV. MIN. | ELV. MAX. |
| POINT 1 | -3 | 7.625 | 0.25 | 0 | 0 |
| POINT 2 | 3 | 7.625 | 0.25 | 0 | 0 |
| POINT 3 | 3 | -7.625 | 0.25 | 0 | 0 |
| POINT 4 | -3 | -7.625 | 0.25 | 0 | 0 |
| POINT 5 | -2.875 | 7.5 | 0.344 | -0.25 | 0 |
| POINT 6 | 2.875 | 7.5 | 0.344 | -0.25 | 0 |
| POINT 7 | 2.875 | 0.25 | 0.344 | -0.25 | 0 |
| POINT 8 | 2.843 | -0.281 | 0.375 | 0 | 0.25 |
| POINT 9 | 2.843 | -7.469 | 0.375 | 0 | 0.25 |
| POINT 10 | -2.843 | -7.469 | 0.375 | 0 | 0.25 |
| POINT 11 | -2.843 | -0.281 | 0.375 | 0 | 0.25 |
| POINT 12 | -2.875 | 0.25 | 0.344 | -0.25 | 0 |
| POINT 13 | -2.625 | 7.25 | 0.375 | -0.25 | -0.165 |
| POINT 14 | 2.625 | 7.25 | 0.375 | -0.25 | -0.165 |
| POINT 15 | 2.625 | 0.5 | 0.375 | -0.25 | -0.165 |
| POINT 16 | 2.656 | -0.469 | 0.125 | 0.165 | 0.25 |
| POINT 17 | 2.656 | -7.281 | 0.125 | 0.165 | 0.25 |
| POINT 18 | -2.656 | -7.281 | 0.125 | 0.165 | 0.25 |
| POINT 19 | -2.656 | -0.469 | 0.125 | 0.165 | 0.25 |
| POINT 20 | -2.625 | 0.5 | 0.375 | -0.25 | -0.165 |
| POINT 21 | 0 | 6.683 | 0.375 | -0.375 | -0.165 |
| POINT 22 | 2.375 | 3.875 | 2.375 | -0.375 | -0.165 |
| POINT 23 | 0 | 1.062 | 0.375 | -0.375 | -0.165 |
| POINT 24 | -2.375 | 3.875 | 2.375 | -0.375 | -0.165 |
| POINT 25 | TANGENT | 5.812 | 0.062 | -0.295 | -0.165 |
| POINT 26 | N/A | 5.719 | 0 | -0.295 | -0.165 |
| POINT 27 | -1.781 | N/A | 0 | -0.295 | -0.165 |
| POINT 28 | -1.875 | TANGENT | 0.062 | -0.295 | -0.165 |
| POINT 29 | 1.875 | TANGENT | 0.062 | -0.295 | -0.165 |
| POINT 30 | 1.781 | N/A | 0 | -0.295 | -0.165 |
| POINT 31 | N/A | 5.719 | 0 | -0.295 | -0.165 |
| POINT 32 | TANGENT | 5.812 | 0.062 | -0.295 | -0.165 |
| POINT 33 | TANGENT | 1.938 | 0.062 | -0.295 | -0.165 |
| POINT 34 | N/A | 2.031 | 0 | -0.295 | -0.165 |
| POINT 35 | 1.781 | N/A | 0 | -0.295 | -0.165 |
| POINT 36 | 1.875 | TANGENT | 0.062 | -0.295 | -0.165 |
| POINT 37 | -1.875 | TANGENT | 0.062 | -0.295 | -0.165 |
| POINT 38 | -1.781 | N/A | 0 | -0.295 | -0.165 |
| POINT 39 | N/A | 2.031 | 0 | -0.295 | -0.165 |
| POINT 40 | TANGENT | 1.938 | 0.062 | -0.295 | -0.165 |
| POINT 41 | 0 | 4.562 | 0.688 | -0.375 | -0.345 |
| POINT 42 | 0 | 4.156 | 0.281 | -0.345 | -0.295 |
| POINT 43 | 0 | 3.875 | CENTER | -0.295 | -0.295 |
| POINT 44 | -1 | N/A | APROX .156 | 0.165 | 0.295 |
| POINT 45 | N/A | -1.531 | 2.344 | 0.165 | 0.295 |
| POINT 46 | N/A | -2.031 | 0 | 0.165 | 0.295 |
| POINT 47 | 1 | N/A | APROX .156 | 0.165 | 0.295 |
| POINT 48 | N/A | -2.75 | APROX .156 | 0.165 | 0.295 |
| POINT 49 | 2.344 | N/A | 2.344 | 0.165 | 0.295 |
| POINT 50 | 1.781 | N/A | 0 | 0.165 | 0.295 |
| POINT 51 | N/A | -5 | APROX .156 | 0.165 | 0.295 |
| POINT 52 | 1 | N/A | APROX .156 | 0.165 | 0.295 |
| POINT 53 | N/A | -6.219 | 2.344 | 0.165 | 0.295 |
| POINT 54 | N/A | -5.719 | 0 | 0.165 | 0.295 |
| POINT 55 | -1 | N/A | APROX .156 | 0.165 | 0.295 |
| POINT 56 | N/A | -5 | APROX .156 | 0.165 | 0.295 |
| POINT 57 | 2.344 | N/A | 2.344 | 0.165 | 0.295 |
| POINT 58 | 1.781 | N/A | APROX .156 | 0.165 | 0.295 |
| POINT 59 | N/A | -2.75 | APROX .156 | 0.165 | 0.295 |
| POINT 60 | 0 | -3.875 | CENTER | 0.165 | 0.165 |

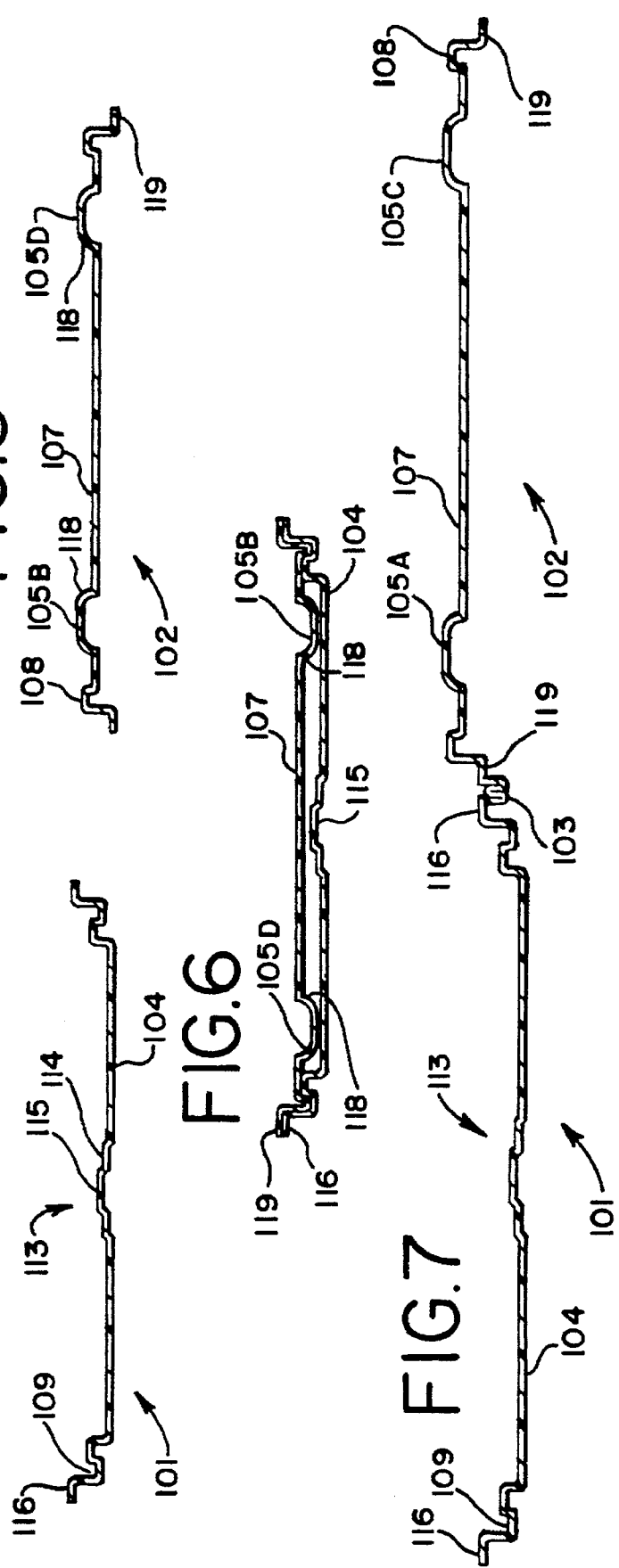

MULTI-USE PACKAGE FOR COMPACT DISKS AND/OR DISKETTES

BACKGROUND OF THE INVENTION

The invention generally relates to packaging for flat circular and/or rectangular items.

The invention is more specifically directed to a thermo-formed, two part package for retaining therein a compact disc and/or a diskette. More specifically, the invention is directed toward this type of package that is also usable as a direct mail piece, a point-of-purchase retail package, or as an enclosure with original equipment sold by an original equipment manufacturer (OEM).

In greater detail the invention is directed toward a thermo-formed plastic package that has a plurality of retention means for holding either a compact disc or a diskette, or for jointly holding both.

The invention is additionally aimed at providing a two-piece package of the "clamshell" type, wherein inserts, such as advertising pieces, informational literature, and the like, may be held within a cavity formed by the two halves of the package in combination with the secure retention of a compact disc and/or diskette.

Heretofore, packages of the thermo-formed kind have been limited to enclosing either a compact disc (CD) or a diskette, but not both. Prior art thermo-formed packages for diskettes unsecuredly contain them within a flat cavity in a loose, rattling fashion typically behind a piece of advertising or informational literature inserted within the package cavity. Other well-known types of compact disc packages have molded retaining trays with center hub engagements. These, however, have not been provided in combination with a retention or securement means for diskettes to be packaged along with the CD, or in a multi-function holding configuration for alternately securely retaining diskettes, compact discs or both.

It would therefore be highly desirable to provide a thermo-formed package, of the clamshell type for selling and distributing audio compact discs, digital audio compact discs, CD-ROM's and computer diskettes, particularly the standard 3.5 inch diameter size. A single package configuration for holding these products would be highly advantageous if it would also be usable for direct mailing, retailing and OEM packaging. It would be additionally beneficial for such a package to be capable of accommodating advertising, printed advertising or informational inserts without interfering with the securement of a CD and/or diskette. In this regard it would be important to eliminate conventional peg and hole, or cavity, frictional engagements inside the marginal edges of the package, so that an insert could have a full margin-to-margin size.

Another object of the invention is to provide a thermo-formed package made of plastic that has alternate means for retaining a diskette, wherein the use of one or another being dependent upon whether a diskette is packaged alone or with a compact disc. To offer this packaging flexibility, would give many sales and marketing options for the merchandiser, distributor, publisher, etc.

A concomitant goal of the invention is to provide a clear plastic clamshell type of package that may be hinged or made in two separable halves. The inventive packaging structure would be particularly useful for marketing computer software or entertainment media. In this regard, it is important that a clear plastic package be designed and configured with efficient retention means for various media, as well as having the capability of displaying software to the consumer through the package.

Yet another target of the invention is to secure the two package parts together by friction fit, heat welding or staking without the use of any adhesives.

An allied objective and achievement sought by the invention is to provide a thermoformed clamshell package which thickness may vary with the nature of the contents, but yet be capable of being manufactured to meet strict U.S. Postal Service requirements for handling these generally flat types of containers.

SUMMARY OF THE INVENTION

The invention comprises a two-part thermo-formed clamshell package having male/female engageable side rails and channels for securing the two parts. A first half of the clamshell includes a circular well with a central hub portion for engagement with the center bore of a compact disc. Thumb depressions are spaced around the circumference of the circular well facilitating removal of a compact disc. Four notches along the circumferential wall of the circular depression are provided to nestingly accommodate four corners of a diskette and in the preferred embodiment are spaced around the circumference of the well to dimensionally correspond to the four rectangular corners of a standard 3.5 inch diskette. The center hub adjoins a raised shoulder for spacing a compact disc away from the bottom of the well, which opposite side thereof is one consumer-facing side of the package. This first half includes peripheral female side channels for receipt of side rails of the male second half. The second half further includes well-opposing embossments extending away from a flat floor or face of the second half of the package at a distance so that upon the mating of the two halves, the embossments have sufficient relief to press against a CD retained in the circular well of the first half. The embossments being arcuately defined at outward borders thereof by the diameter circular well, whereby they may fit within the boundaries of the well, to press against a CD. The embossments are also defined at inward faces or sides thereof by the rectangular shape of the diskette to provide inward opposing faces at the four sides of the rectangular shape and peripherally retain a diskette along part of its sides. These embossments of the second half are provided in a height to be alternately useful in pressing against an insert disposed inside the package and thereby pressing the insert against a CD and/or diskette retained by the first half. The embossments and four notches are cooperative to retain a diskette in the package with no CD inside. Thereby a multi-functional retention means is provided for holding diskettes, CD's, or both, with or without printed inserts.

Optionally, point of purchase hanger apertures may be opposingly formed through the first and second halves of the clamshell for retaining the package upon a hook-type display.

The package and contents-containing cavity formed between them may be peripherally sealed along outwardly extending flanges that extend from the side rail and channel by the process of heat sealing, sonic bonding, thermo transfer, or equivalent, as known in the industry. It is also envisioned that the interfitting side rail and channel can be eliminated and the package sealed to closure only by means of heat sealing, sonic bonding, or equivalent. It is also within the scope of the invention to secure the package closed solely by a friction fit, or snap fit, type of mechanical engagement of the interfitting side rail and the channel without requiring heat sealing, sonic bonding or equivalent.

BRIEF DESCRIPTION OF THE DRAWINGS

FIG. 3 is a dimensional chart for the relative X, Y distance coordinates and elevational dimensions taken from reference planes in regard to numbered location points on both halves of the package as noted on FIG. 2;

FIG. 4 is a cross-sectional view of FIG. 1 taken along line 4—4 looking in the direction of the arrows;

FIG. 5 is a cross-sectional view of FIG. 1 taken along the line 5—5 looking in the direction of the arrows;

FIG. 6 is a cross-sectional view of the combination of FIGS. 4 and 5 when the halves of the package are closed to contain product(s) therein;

FIG. 7 is a cross-sectional view of FIG. 1 taken along the central long axis of the package at line 7—7 looking in the direction of the arrows;

FIG. 8 is a cross-sectional view of one of the diskette-engaging notches formed around the disc-retaining well taken along line 8—8 looking in the direction of the arrows and showing the location of a CD and diskette in dashed lines as they would be relatively positioned thereat;

DETAILED DESCRIPTION OF THE INVENTION

Figure 1:
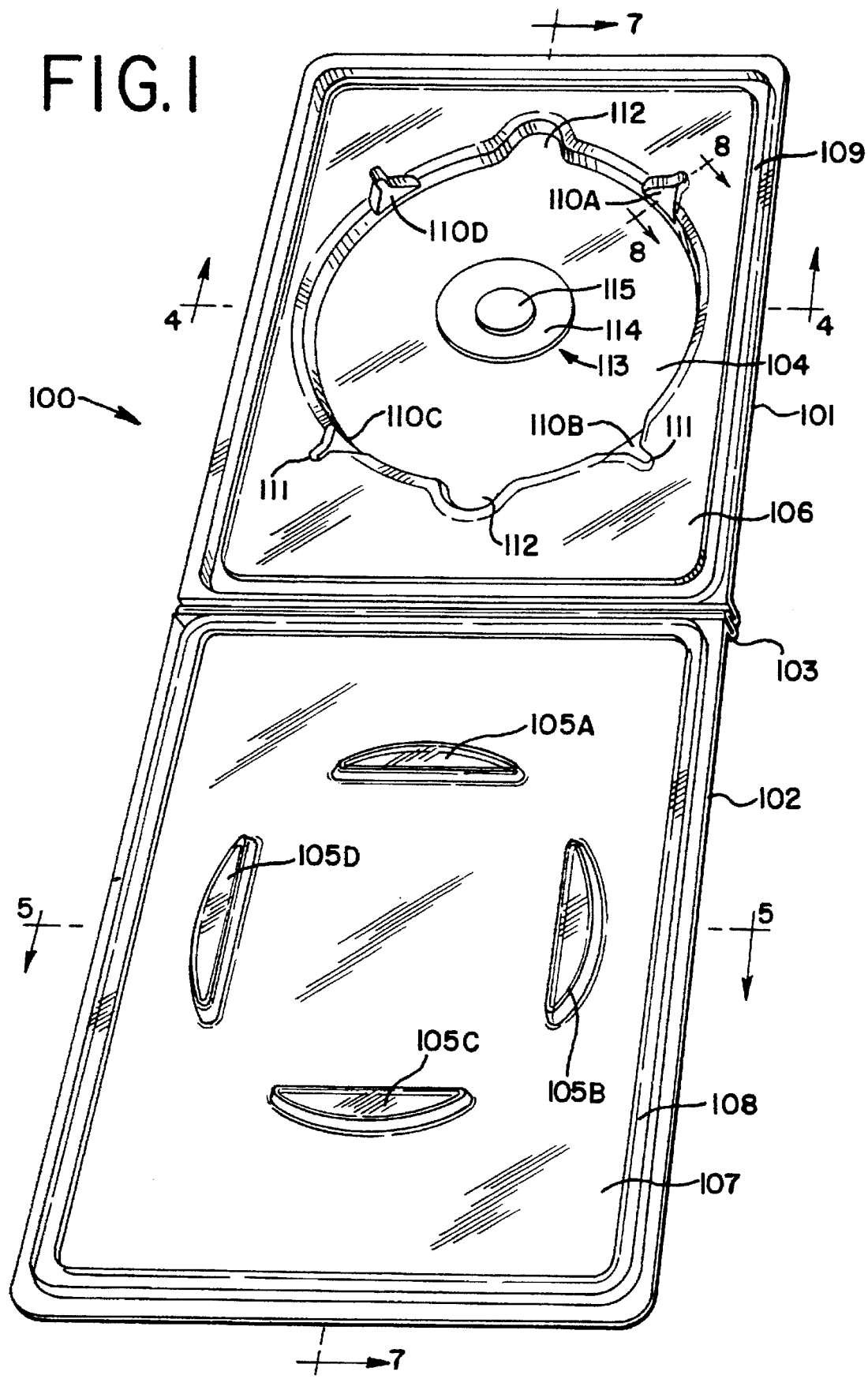
FIG. 1 is a perspective view of a hinged multi-use package for compact discs and/or diskettes in accordance with the invention in a folded open arrangement.

The invention will be more fully described herein after with reference to FIGS. 1–14, wherein like reference numerals throughout refer to the same elements.

Figure 2:
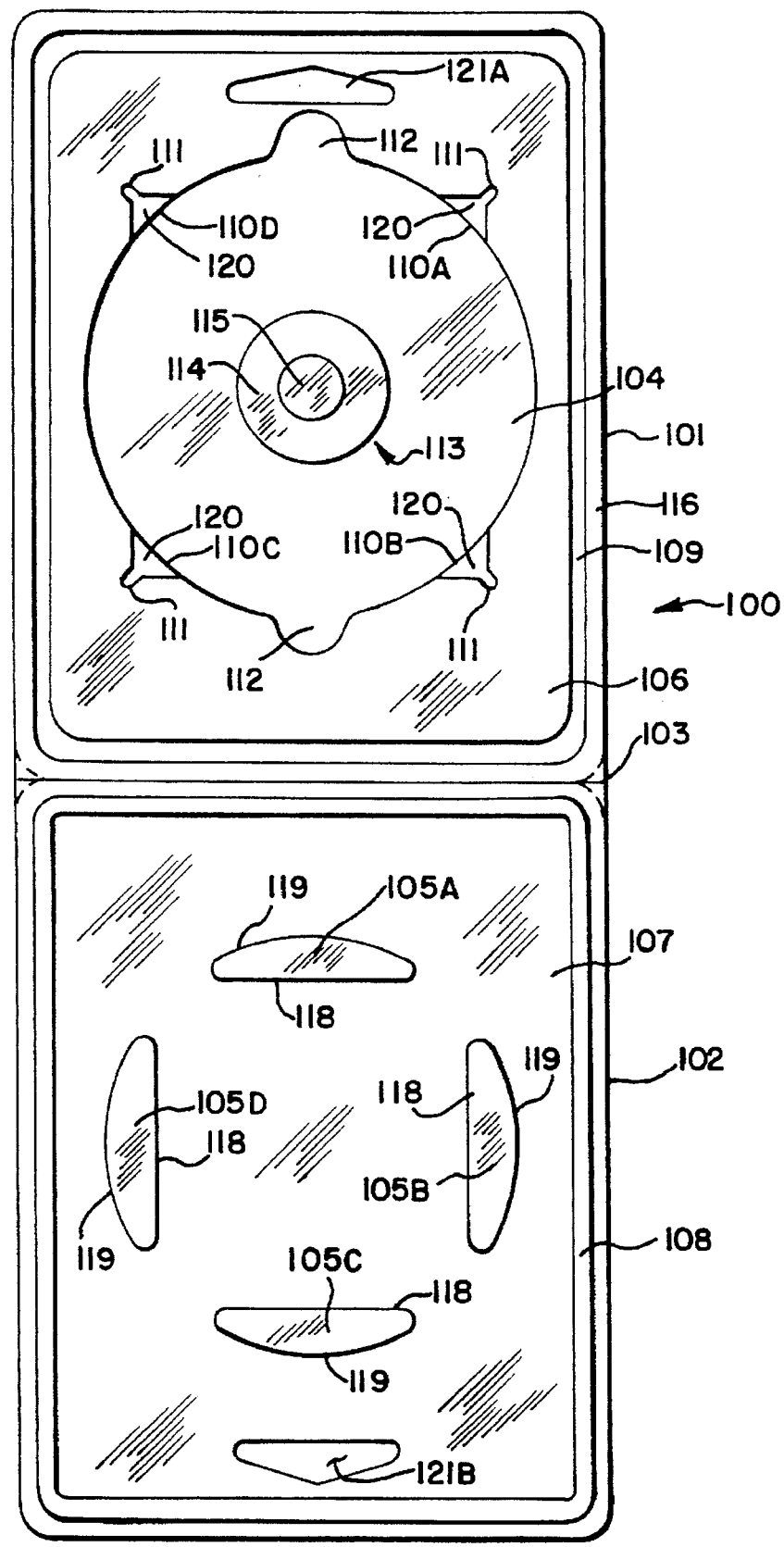
FIG. 2 is a plan view of the package as in FIG. 1.
Figure 9:
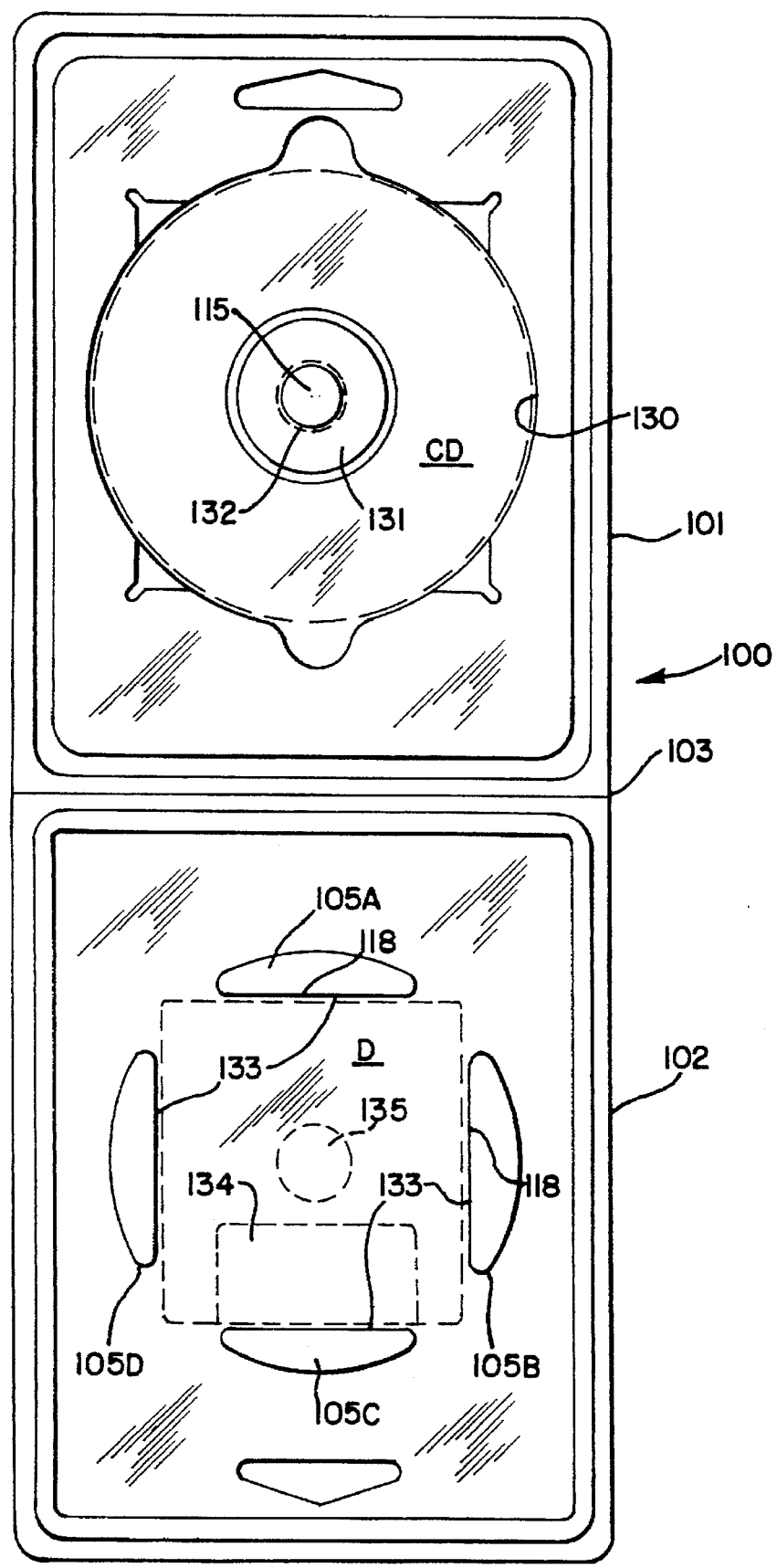
FIG. 9 is a plan view of the package as in FIG. 1 and showing a compact disc positioned at the first half the package and a diskette positioned at the other half.

With attention directed first to FIGS. 1 and 2, a preferred embodiment of the multi-use package is generally denoted by reference numeral 100. The multi-use package 100 is of the type known in the industry as a "clamshell" because it is formed by two shells or halves that are sealed closed to contain a product therein. More specifically, the multi-use package 100 comprises a first shell half, or part, 101 to be closed over a second shell half, or part, 102. In the illustrated embodiment, the package 100 is made of vacuum or thermo-formed polyvinyl chloride (PVC), polyethylene terephthalate (PET), recycled PET, polyethylene terephthalate glycol (PETG), or equivalent, having a thickness of about 0.024 inches. These types of plastics provide a clear transparent package, so that the contents or printed literature contained within the cavity formed by closing the shell halves 101, 102 is readily viewable to the purchaser/user.

The package 100 offers multi-function capabilities heretofore not found in previous clamshell packaging, whereby both a compact disc and diskette, with or without printed inserts may be contained in the package 100; and alternately wherein either a compact disc or a diskette may be retained with or without printed inserts inside. In any of the combinations, the compact disc and diskette are physically gripped and retained by the interior configurations of the shells 101, 102, as will be more fully explained below.

The preferred form of package 100 provides for the accommodation of a standard size 3.5 inch diskette insertable into personal computer disk drives and standard size compact discs, or CD ROM's, which have a diameter of about 4.7 inches.

The first half 101 and second half 102 are joined by a central hinge 103. The hinge 103 is flexible and integrally thermo-formed in conventional molding equipment used by vacuum and thermo-forming manufacturers. The half 101 is a female side having a depressed doughnut-shaped well 104 and the half 102 is a male side having embossments 105A–D that can fit within the well 104 when the package 100 is closed. The well 104 is depressed below a generally rectangular planar face 106 and the embossments 105A–D are struck up from a generally rectangular planar face 107. The half 102 is provided with peripheral side rails bounding the face 107 for frictional, locking engagement with a matingly formed peripheral channel 109 around the periphery of the half 101. The channel 109 is nestingly engageable by the side rail 108 upon the rotation of the halves 101, 102 about the hinge 103 to close the package 100. The clamshell-like configuration for package 100 usually functions so that the package contents determines which half 101 or 102 is pivoted onto the other half. Usually, an unfilled side would be pivoted to the fried side. In other uses, both halves may be filled, so that one or both may be rotated to closure.

With more detailed reference to half 101, it will be seen that the doughnut-shaped well 104 is circumferentially broken at four evenly spaced triangular notches 110A–D. Because of thermal/vacuum molding requirements and physical limitations, the triangular notches 110A–D each have rounded outer slots 111 formed because these thermo-forming techniques do not make it possible to mold a corner small enough to accommodate a square corner of a 3.5 inch diskette. Adding the rounded end slots 111 relieves the corner without producing a problem for mold makers, as would be understood by one skilled in the art. The accommodation of diskette corners at the triangular notches 110A–D will be more fully understood in connection with FIG. 11. To facilitate removal of a compact disc from the doughnut-shaped well 104, the circumference of the doughnut-shaped well is broken at two diametrically opposed finger notches 112. The finger notches 112 aid the consumer in removing a compact disc for use. Centered in the well 104 is a doughnut-like hub 113 having an annular shoulder 114 raised slightly above the depressed well 104, as better viewed in FIG. 4, and a central disc-engaging hub 115 for engageable receipt through the central aperture of a compact disc. Thereby, a compact disc would be supported on the annular shoulder 114 and spaced slightly away from the bottom of the depressed well 104. This spacing also provides a gap allowing for the insertion of a label, informational page, advertising insert, and the like, between a compact disc and the well 104 to be observable by the purchaser.

In the disclosed embodiment, the well 104 has a diameter of about 4.75 inches in order to accommodate the diameter of a compact disc, which is generally manufactured at about 4.7 inches.

The female channel 109 generally borders the first half 101 and in the preferred embodiment is approximately 0.250 inches wide and 0.250 inches deep. The channel 109 structure is formed with an exterior flat edge flange 116 which creates the marginal periphery of the half 101 and provides a surface for heat bonding to a similarly formed edge flange 119 of the second half 102, as will be explained below.

The embossments 106A–D of the male half 102 are cooperative with the well 104. Each embossment 105A–D has a straight interior side 118 and an arcuate outer side 119. The diameter of the arcuate side 119 is defined by a radius slightly less than the radius of the well 104 whereby upon closure of the clamshell-like package 100, the embossments 105A–D reside interiorly of the well 104, as further shown in FIG. 6. In the disclosed embodiment, the radius of the arc defining the arcuate surfaces 119 is approximately 2.344 inches. The second half 102 is rimmed by the side rail 108, which is approximately 0.250 inches wide and 0.250 inches high for frictional nested engagement within the channel 109 of the first half 101, as will be clearly understood in connection with the cross-sectional view of FIG. 5. The embossments 105A–D and side rail 108 are raised above the rectangular flat face 107.

The distance between the flat sides 118 of embossments 105A and 105C is sized to accommodate the length-wise dimension of a 3.5 inch diskette. Similarly, the distance between the flat sides 118 of the embossments 105B and 105D is sized to accommodate the width of a 3.5 inch diskette. The 3.5 inch diskette is standard in the industry with a length slightly greater than its width. Accordingly, the embossments 105A and 105C are a greater distance apart than 105B and 105D. To be able to fit within the well 104, the embossments 105A and 105C are slightly smaller than the embossments 105B and 105D, so that their sides 118 can be spaced apart a distance sufficient to accommodate the long dimension of a diskette. Thus the sizes of the embossments 105A–D are dictated by two parameters: (1) interiorly by the radius of the compact disc well 104; and, (2) exteriorly by the rectangular/dimension length and width of a computer diskette. Because the embossments 105A and 105B are further apart to accept the length of a diskette, they are smaller in size than the embossments 105B and D.

FIG. 3 is a dimensional chart that shows the three dimensional relationship of points 1–60 shown on the CAD illustration of FIG. 2. The X, Y reference coordinates are provided in the first two columns, the radii of the arcs are shown in the third column, and the plus and minus elevations of the points are listed in the fourth and fifth columns. As will be understood from FIG. 7, the zero elevation is a plane in which the peripheral flange 116 of the first half 101 and the peripheral flat flange 119 of the second half 102 reside in the flat opened arrangement of FIGS. 2 and 7. The notations of the coordinate reference points 1–60 are for purposes of illustrating a preferred embodiment, but are not to be understood as limitations on the invention as claimed hereinafter.

In an alternate form, the invention includes a non-hinged two part package 100 by the elimination of the flexible hinge 103. For example, in FIGS. 4 and 5, the peripheral flat flanges 116 and 119 would not be hingedly joined and would be capable of being closed as in FIG. 6 by disposing one on top of the other without the need for rotating them relative to each other, as in the hinged embodiment shown in FIGS. 1 and 7. Further in that regard, the coordinate and elevational references in FIGS. 2 and 3 would also be the same for the nonhinged embodiment because the only differences in the package are the elimination of the hinge 103 and a rounding of the corners at points 7, 8, 11, 12, as shown in broken lines in FIG. 2.

The notches 110A–D and embossments 105A–D provide means for engaging a diskette only, which packaging arrangement is dependent upon the type of software and/or media packaging to be sold. The embossments 105A–D provide for the retention of a rectangular diskette inside of them in the rectangular zone bounded by their interior sides 118, so that a diskette would lie between pairs of opposing embossments (105A–105C and 105B–105D) and against the face 107 of the half 102. At the first half 101, the corners of a diskette would be engaged in the notches 110A–D. Inserts may also be included in this arrangement, such as advertising, informational literature, cards and the like inserted between the diskette and the embossments 105A–D or within the well 104. If an insert is spaced between the embossments 105A–D and the diskette, the diskette, of course, will not contact against or lie within the embossments 105A–D.

The cross-sectional view of FIG. 8 shows the notch 110A in more detail and is identical to the configurations of the other notches 110B–D. Each of the notches 110A–D is provided with a raised triangular ledge 120 spaced above the well 104 as shown. The elevation of the ledge 120 is intermediate the well 104 and the plane of flat face 106. The depth of the ledge 120 below the flat face 106 is sufficient to meet the thickness of a diskette, as would be clear to those skilled in the art. The distance between the plane of ledge 120 and the well 104 is accordingly sized whereby to accommodate the thickness of a compact disc below a diskette retained by the notches 110A–D. This arrangement will be further understood in connection with FIGS. 9–14 showing various combinations of packaging for diskettes and/or compact discs, with optional inclusion of insert labels, advertising, information cards, and the like.

FIG. 8 further includes in dashed lines an illustration of the arrangement of a diskette and a CD as they would reside in the first half 101 when packaged together without an insert between them. This arrangement will be further understood also in connection with FIGS. 9 and 12.

Figure 10:
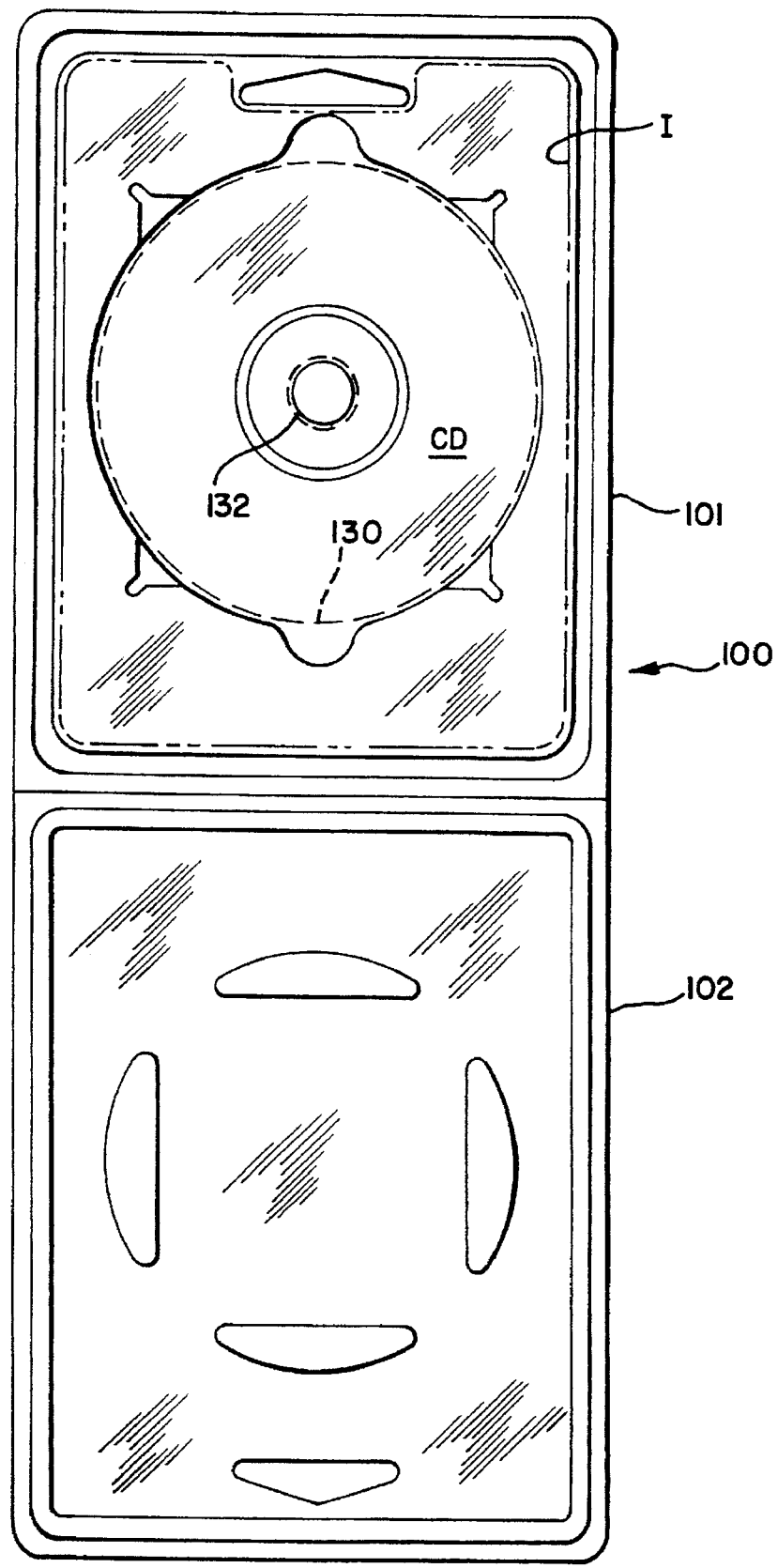
FIG. 10 is a plan view of the embodiment as shown in FIG. 9 showing a compact disc and insert card held by the first half of the package.
Figure 11:
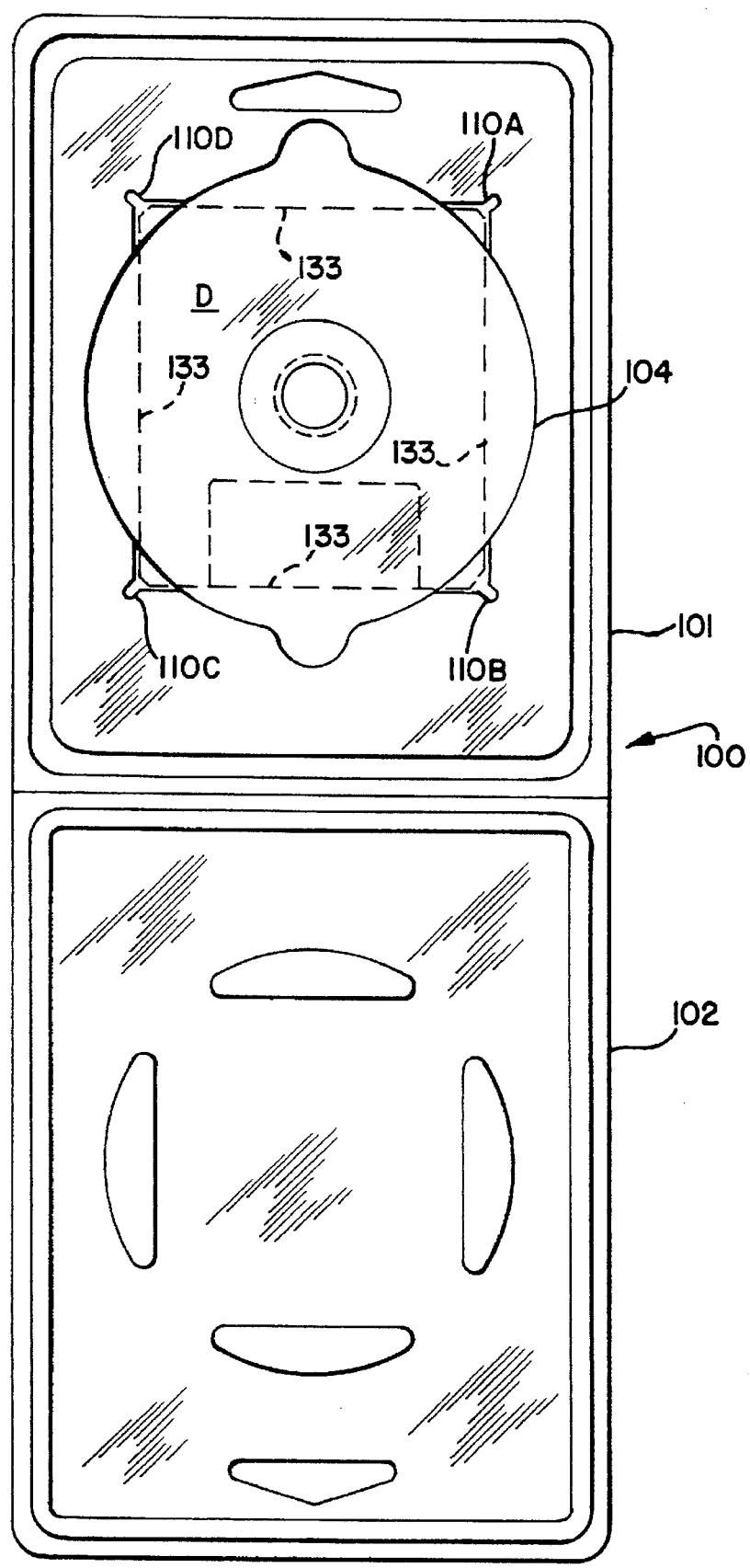
FIG. 11 is a plan view as in FIG. 9 and showing the packaging of a diskette only retained by the four corner notches formed along the compact disc well.
Figure 12:
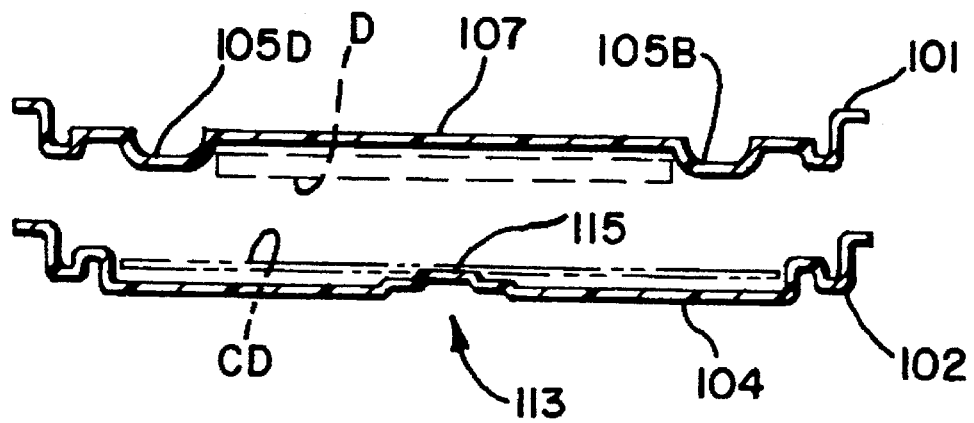
FIG. 12 is a cross-section of the package arrangement in FIG. 9 but in the closed condition and slightly exploded apart for purposes of explanation.

To illustrate some of the various combinations of packaging functions that the invention provides, attention is now directed to FIGS. 9–14. The circular well 104 in the first half 101 can receive a compact disc CD therein, as shown in dashed lines in FIG. 9. The CD has an outer circumferential edge 130, a center hub 131 and a center aperture 132 engaged to the hub 115. The second half 102 in FIG. 9 includes a diskette D depicted in dashed lines and held within the embossments 105A–D, which retain it along its periphery 133. The diskette D has the usual slide access panel 134 and center wheel 135 in a known construction. With the package assembly of FIG. 9, the halves 101,102 are pivoted toward each other at the hinge 103 to close, as shown in FIG. 12. FIG. 12 is illustrated slightly exploded by vertically separating the half 101 from the half 102. The corners of the diskette D nestably rest within the notches 110A–D as in FIG. 8, upon the closure of the package 100. In the event that the manufacturer wishes to include printed insert literature or the like between the diskette D and compact disc CD, the corners of the diskette D would not reside within the notches 110A–D and the diskette D would be securably retained within the boundary of the sides 118 of the embossments 105A–D and pressed between the insert and the face 107. It should be understood that the embossments 105A–D have a sufficient depth to press against the back of a compact disc to securably hold it within the doughnut shaped well 104. This securement will also be understood in reference to the closed arrangement of the package 100 shown in the cross-sectional view of FIG. 6. It will also be seen that the hub 115 serves to press against the diskette D as in FIG. 12 when the clamshell package 100 is closed and thereby also aid in securely holding the contents within the closed package.

Figure 13:
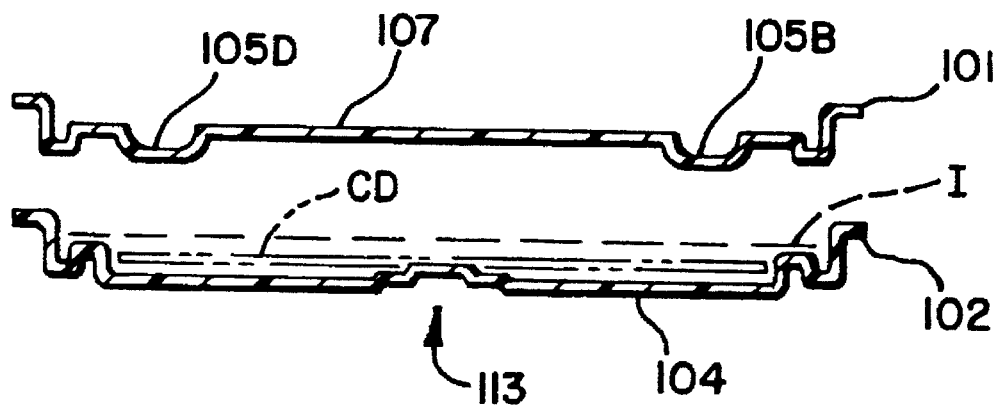
FIG. 13 is a cross-section of the package arrangement in FIG. 10 but in the closed condition and slightly exploded apart for purposes of explanation; and, FIG. 14 is a cross-section of the package arrangement in FIG. 11 but in the closed condition and slightly exploded apart for purposes of explanation.

Turning now to FIG. 10, the package 100 is shown accommodating a compact disc CD at the first half 101 and a printed insert I behind it, both shown in broken lines. Under United States Postal Service requirements, inserts for mailers must be spaced, or inset, one-half inch from the edge of a mailer. The halves 101 and 102 are closable together whereby to provide a package that is in the rectangular format, with rounded outer corners, acceptable by the automated package handling equipment of the United States Postal Service. The restrictions placed on the inserts for clamshells are the same as for direct mail pieces, and accordingly, the literature or insert I is held to be spaced inwardly the required one-half inch from the outside border of the package 100. This spacing places the insert I at about 3/32 inches inside points 13–15 and 20, as shown in FIG. 2. In FIG. 10, the package 100 does not hold a diskette at either of the halves 101 or 102. FIG. 13 shows a cross-section of the package assembly shown in FIG. 10 and is slightly exploded for purposes of illustration. It will be observed that the embossments 105A–D will press against the insert I and thereby against the compact disc CD to hold it within the package 100 in a secure non-slidable manner. In this arrangement, or assembly, of the package 100 and contents therein, the notches 110A–D serve no holding function. As will also be understood, if an insert would be placed between the diskette D and compact disc CD shown in FIG. 12, the corners of the diskette D would not be insertable in the notches 110A–D because the insert would be overlying the notches 110A–D. Thus, also in this last-mentioned arrangement the notches 110A–D would serve no retentive function.

Further in accordance with the invention, the package 100 may contain only a diskette D. Turning to FIG. 11, a diskette D is illustrated in dashed lines wherein its four corners reside within the notches 110A–D in the association shown in FIG. 8, but without a compact disk CD present. In further reference to FIG. 14, the diskette D is additionally retained within the embossments 105A–D which hold it along its peripheral edge 133. The hub 115 centrally presses against the diskette D to firmly hold it within the package 100. The retention of the diskette D by the package 100 is also understandable in reference to FIG. 6, where it will be seen that a diskette D is nestable between the opposing sides 118 of the embossments 105A–D and centrally clamped by the hub 115 against the inside of the planar face 107. The arrangement of the package 100 in FIG. 11 would further accept the insertion of an insert I over the diskette D and optionally could hold a circular-cut insert arranged within the doughnut shaped well 104. As noted above, if an insert is placed over the diskette D, it would not be arranged within the embossments 105A–D, but the insert would be pressed against it by the embossments 105A–D.

Figure 14:
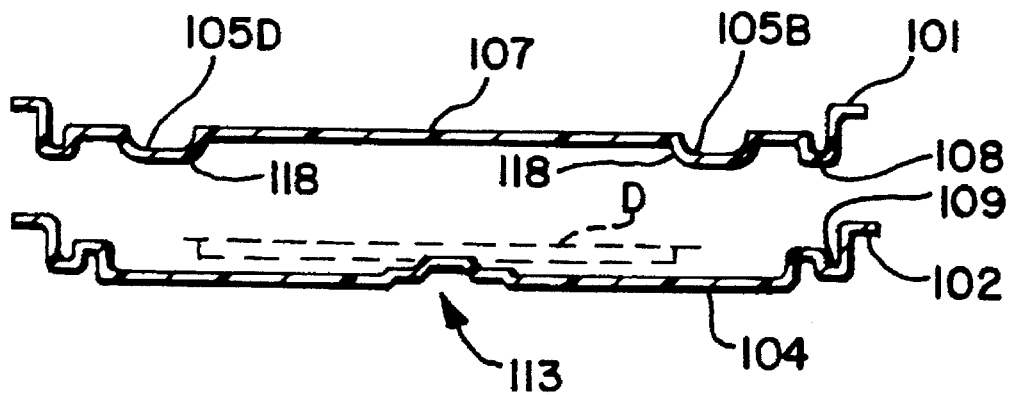

Alternatively, in FIGS. 11 and 14, if an insert were placed inside the half 101, covering the well 104 and face 106, the embossments 105A–D are sufficient by themselves to securely hold a diskette D without need of the notches 110A–D. As a result, either the embossments 105A–D or notches 110A–D may retain a diskette D or they may both act in combination. This is also the case if a CD is included, as in FIG. 12.

ACHIEVEMENTS OF THE INVENTION

In achieving the goals set forth, the package 100 affords numerous combinations of packaging arrangements allowing a wide range of software and entertainment media to be packaged. The products are laterally restrained in a safe, secure manner. The package 100 provides a sealed visually appealing package. Printed literature and other inserts may be placed behind software diskettes so the software is prominently visible inside the package, for example, when presented on a retail display rack. In this regard, the halves 101, 102 may be punched-out to provide hanger holes 121A and 121B, respectively, which opposingly meet when the package 100 is closed for hanging the package 100 on a hanger hook and the like for retail display merchandising.

The package 100 is sealed to closure along the exterior flanges 116, 119 preferably by heat sealing or heat staking. This may be accomplished by sonic bonding, heat welding, heat staking, thermo transfer, or the equivalent. Additionally, a frictional fit engagement of the side rail 108 to the side channel 109 may be made by close mold tolerances, so that a friction or snap fit therebetween may be sufficient to seal the package 100 without sealing the flanges 116, 119. It is envisioned that the package 100 may be heat sealed and/or frictionally closed this way without the use of any adhesives. Moreover, it is foreseen that the package 100 can be sealed to closure only by heat sealing, heat staking, sonic bonding, or equivalent, and eliminate the side rail 108 and the channel 109 interfitting mechanical-type securement. It is further envisioned that compact read-only memory discs (CD-ROM's) are equally accommodated by the package 100. Accordingly, the package 100 has versatility for retail display by being capable of either being placed on a display hook, so that the package would hang down and the contents visible through the clear plastic, or displayed upright in a shipped-to display case that could be erected in a store. The novel internal structure of the package 100 allows its contents, whether diskettes or compact discs, to be presented with their labelled sides facing out to the consumer. The only connections between the halves 101 and 102 are along their out boundaries. By eliminating the prior art peg and hole (or cavity) inward spaced connections, expansive full package inserts may be slid between the halves 101 and 102 for substantially the full areas of faces 106 and 107 within the peripheral bounds of side rail 108 and channel 109.

Significantly, the direct mail use of the package 100 is achieved because its rectangular format with rounded outer corners is readily acceptable by United States Postal Service automated sorting equipment. This allows the package to be sorted with ordinary mail and delivered by a postal carrier to the consumer in the usual manner. It is noteworthy that the contents of a package 100 for direct mail use may be the same as in retail operations. It would also be clear that the package 100 has great advantage for OEM's as packages for diskettes, CD-ROM's sold with original equipment, such as being containerized with personal computers, audio and visual equipment, and the like, as would be appreciated by those skilled in this industry.

While the invention has been described in connection with an illustrated embodiment shown in FIGS. 1–14, it is not limited thereby and a broad range of equivalent structures are considered to fall within the scope of the claims appended hereto.

What is claimed is:

1. A two-part thermo-formed package having a compact disc and non-circular diskette securably retained within a cavity formed therebetween comprising:

a first part having a flat face and a depression formed therein with a central hub means for engaging a center aperture of a compact disc and a plurality of notches formed around said depression said notches are generally triangular shaped and include ledges retaining corners of the non-circular diskette and spacing the diskette from the compact disc;

a second part having a flat face and a plurality of embossments raised therefrom and extending into said first part and pressing against said compact disc for retention thereof;

said embossments having linear interior sides corresponding to linear sides of the non-circular diskette;

said first part further including an engageable channel and said second part including a side rail nestably engaged within said engageable channel and securing said first and second parts together;

and said first and second parts having means extending package-outwardly therefrom for sealing the package closed.

2. A two-part thermo-formed package as in claim 1 wherein said package includes an insert disposed between the compact disk and diskette.

3. A two-part thermo-formed package as in claim 1 wherein said package includes an insert disposed between said diskette and said plurality of embossments.

4. A two-part thermo-formed package as in claim 1 wherein said package includes an insert disposed between said depression and the compact disk.

5. A two-part thermo-formed package as in claim 1 wherein said package includes a cut-out therethrough for hanging said package on a display rack.

6. A two-part thermo-formed package having a compact disc securably held therein and comprising:

a first part having a depressed well formed from a flat face thereof and a central hub engageable with said compact disc, said central well including a plurality of notches;

said notches are generally triangular shaped and include ledges for retaining corners of a non-circular diskette and spacing a diskette from the compact disc;

a second part having a plurality, of embossments raised from a flat face thereof and extending into said first part and pressing against said compact disc to retain it within said depressed well;

and said first and second parts including matable rail and channel means peripherally extending therearound to secure said package together and means extending from said rail and channel means for sealable closure of said package.

7. A two-part thermo-formed package as in claim 6 including an insert disposed between said compact disk and said plurality of embossments.

8. A two-part thermo-formed package as in claim 6 including an insert disposed between said compact disk and the depressed well.

9. A two-part thermo-formed package as in claim 6 wherein said package includes a cut-out therethrough for hanging on a display rack.

10. A two-part thermo-formed package containing a diskette therein and comprising: a first of said two parts having a planar face and a depressed well therein, said depressed well including a central upstanding hub and a plurality of notches spaced therealong, said notches engaged by corners of said diskette; said second part having a plurality of embossments extending from a flat face thereof and opposing said depressed well, the embossments being pressed against said diskette whereby to securably retain it between said first and second parts; and, said first and second parts including peripheral rail and channel means for locking engagement therebetween and means extending outwardly therefrom for sealable closure of said package.

11. A two-part thermo-formed package as in claim 10 wherein said package includes an insert disposed between said diskette and said plurality of embossments.

12. A two-part thermo-formed package as in claim 10 wherein said package includes an insert disposed between said diskette and said first part.

13. A two-part thermo-formed package as in claim 10 wherein said package includes a cut-out therethrough for hanging said package on a display rack.

* * * * *